Aug. 29, 1972     J. R. EMMETT     3,687,843
WATER TREATMENT PROCESSES
Filed May 6, 1971                 2 Sheets-Sheet 1
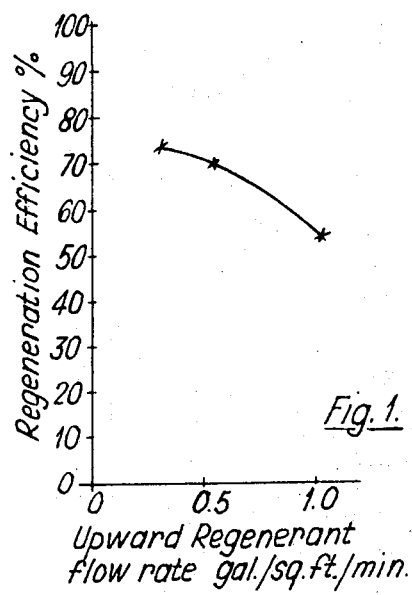
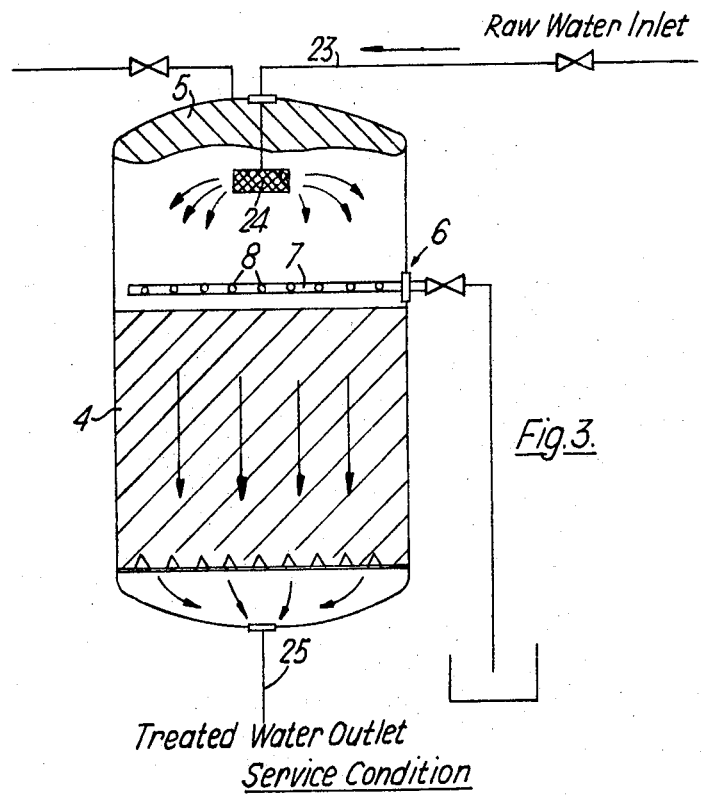
Inventor
JAMES R. EMMETT
By Mason, Fenwick & Lawrence
Attorneys Regeneration Condition United States Patent Office 3,687,843
Patented Aug. 29, 1972

3,687,843
WATER TREATMENT PROCESSES
James Ratcliffe Emmett, Purley, England, assignor to Weir Water Treatment Limited, Cathcart, Glasgow, Great Britain
Continuation-in-part of application Ser. No. 730,151, May 17, 1968. This application May 6, 1971, Ser. No. 140,784
Claims priority, application Great Britain, May 18, 1967, 23,010/67
Int. Cl. B01d 15/06
U.S. Cl. 210—35
7 Claims

ABSTRACT OF THE DISCLOSURE

In effecting multi-stage regeneration of a spent resin following treatment of water by downflowing same through a resin bed in a container housing a collector at the top of the bed, different treating liquids at different stages are passed upwards at different rates through the spent resin and out of the container through the collector and at each stage gas from a source of pressurised gas is continuously passed into the freeboard space and is continuously released from the container through the collector with the liquid so as to prevent formation of a static head above the collector and consequent fluidisation of the bed. The pressure of the throughflowing gas adjusts to the different upflow rates without the need for repeated valve adjustment and repeated viewing of the liquid level.

---

This invention is a continuation-in-part of my co-pending patent application Ser. No. 730,151, filed May 17, 1968, now abandoned.

The invention relates to an ion-exchange process for the treatment of liquid, and relates more specifically to a process involving the regeneration of spent particulate ion-exchange resins.

For convenience the invention is described herein with reference to the ion-exchange treatment of water, but it is to be understood that it is applicable to any other liquid, e.g. a sugar or starch solution, which may be treated by passage through particulate ion-exchange resin.

With existing particulate ion-exchange beds, a common procedure during the regeneration cycle is first to backwash the resin bed by means of an upward flow of water, and then to cause the regenerant solution to flow downwards through the bed.

Much improved performance can be obtained from ion-exchange resins and from ion-exchange resin systems by means of counter-current regeneration. This method of regeneration enables a higher exchange capacity to be obtained from the resin at a given regenerant level, which in turn means a higher regenerant efficiency. In addition, a substantial improvement in the quality of treated water is achieved.

It is desirable that during a treatment cycle the water being treated flows downwards through the ion-exchange bed. It follows that in counter-current regeneration the liquid regenerant flows upwards through the bed. For best results in counter-current regeneration it is essential to avoid fluidisation, by the upward flow of the liquid regenerant, of a particulate ion-exchange bed containing resin beads having strongly functional groups. Fluidisation causes mixing and loss of counter-current action. If, due to the mixing action a bead of resin which has become well regenerated is moved into an environment where it is surrounded by a liquid containing a high proportion of spent regenerant, then the resin bead would become subject to reverse regeneration and become exhausted again. For example, a strongly basic anion resin which has been substantially converted to the hydroxide form by the regenerant but is moved by fluidisation into a zone where the surrounding liquid consists substantially of spent regenerant comprising a solution of sodium chloride, sodium sulphate, sodium carbonate or other sodium salts, would commence to convert these salts to sodium hydroxide and in doing so would become exhausted.

Ion-exchange resins having weakly functional exchange groups are not subject to reverse regeneration in the same way as resins with strongly functional groups. For example, a weakly acidic resin has a high affinity for acid and regenerates with ease. The hydrogen form of the resin cannot exchange cations from neutral salts other than to a very limited extent, and an alkaline salt is required to convert the resin to the salt form. Consequently should fluidisation bring about the movement of a bead of resin which has been largely converted to the hydrogen state, so that it is surrounded by a solution substantially consisting of spent regenerant, no ion exchange takes place.

The effect of fluidisation on the efficiency of regeneration of a strongly functional cation resin exhausted to the calcium form and regenerated with an upward flow of 9.0% solution of sodium chloride at a regeneration level of 6.5 lbs. salt per cubic ft. of resin can be seen from FIG. 1. This graph shows clearly that as the upward flow of liquid regenerant increases, the efficiency of the process falls.

Efficient counter-current regeneration of exhausted ion-exchange material in an ion-exchange unit involves changing the upward flow rate of liquid at different stages of the regeneration cycle. A usual ion-exchange unit includes a particulate ion-exchange bed in the lower region of a container and a collector system in the container at the upper end of the particulate bed and having entry means for upflowing treating liquid. It is found that for maximum regenerating efficiency and a high quality of treated water in a sodium cycle softening process using such a unit, the following regenerating stages are necessary:

(a) The regenerant sodium chloride solution having a strength of two equivalents per litre NaCl is introduced into the bed at an upward flow rate of 0.6 imperial gal. per minute per ft.$^2$ of bed area (1 imperial gallon=1.2 U.S. gallons).

(b) The regenerant solution is displaced from the bed by an upward flow of water through the bed at a rate of 0.4 gal. per minute per ft.$^2$ of bed area.

(c) Once the regenerant solution has been swept from the interstices of the particles of the bed, the material is rinsed, and for this purpose, rinse water is passed upwards through the bed at a flow rate of 1.4 imperial gals. per minute per ft.$^2$ of bed area.

The head loss into the collector system has a square law relationship to flow and therefore with a 3.5 times increase in flow rate the increase in head loss is by a factor of 12.2. Thus, if the collector system has a 6 inch water gauge head loss with an upward flow of 0.4 gal. per minute per ft.$^2$ of bed area, then the head loss at 1.4 gals. per minute per ft.$^2$ of bed area will be 73 inches water gauge. It follows that if fluidisation is to be eliminated it is necessary to deal with fluidising heads of different magnitudes during a single regenerating cycle.

One object of the present invention is to facilitate optimal resistance to fluidisation of the particulate bed.

Another object of the invention is to simplify the counter-fluidisation procedure required when operating a multi-stage regeneration process.

It has previously been proposed to regenerate exhausted ion-exchange material in an ion-exchange apparatus which includes a particulate ion-exchange bed in the lower region of a container and a collector in the container at the upper end of the particulate bed and having entry means for upflowing treating liquid, by a process comprising continuously passing treating liquid upwards through the bed and out of the container through the collector, and introducing pressurised gas into the upper region of the container through a control valve so as to form in the container an air cushion whereof the pressure is balanced against the surge of the treating liquid, said air cushion serving to maintain a top zone of semi-dry ion-exchange material which restrains the bed against upward expansion (fluidisation). In this apparatus the upper region of the container is vented to atmosphere through a second control valve, and a level-indicating device at the side of the container bridges the air/liquid interface. Accurate setting of the interface at the desired level will apparently involve manipulation of both valves and, simultaneously, viewing of the level-indicating device, and an individual setting will be required for each liquid upflow rate.

According to the present invention there is provided a process for regenerating exhausted ion-exchange material in an ion-exchange apparatus which includes a particulate ion-exchange bed in the lower region of a container and a collector in the container at the upper end of the particulate bed and having entry means for upflowing treating liquid, the process comprising continuously passing treating liquid upwards through the bed and out of the container through the collector and providing pressurised gas in the upper region of the container to depress the static head of liquid above the entry means of the collector to a level at which fluidisation of the particulate bed is inhibited, wherein gas at a pressure in excess of that required to maintain the liquid at the depressed level is continuously fed into said upper region and gas is continuously released from said upper region at the depressed level of the liquid so as to relieve said upper region continuously of said excess gas pressure.

With this novel concept, simple on/off manipulation of a single valve is all the control required to enable elimination of the problem of fluidisation.

Moreover, with this novel concept, simply by ensuring that the pressure of the gas source is somewhat in excess of the maximum static head of a range of static heads produced at different stages of the regenerating cycle and by providing for adequate gas release at the desired level, the same simple on/off valve manipulation serves to ensure non-fluidisation at each stage. Also, in the event that the static head tends to rise due, say, to wear in the collector or to the presence of clogging debris in the entry means of the collector, no level-adjustment by the operator is required as the gas pressure at the source is adequate to cause the gas pressure in the upper region of the container to build up and counter-balance the increase in the static head.

Immediately prior to the introduction of the liquid regenerant into the bottom of the container housing the particulate bed, and of the pressurised gas into the upper region (freeboard space) of the container, the water in the freeboard space above the bed may be drained down to the level of the collector so that the surface of the bed dries out. Alternatively, the pressurised gas may be introduced into the top of the container to aid drainage through the collector of water in the freeboard space.

Under the conditions of the invention, very high upward liquid upflow rates can be achieved without any fluidisation of the particulate ion-exchange bed taking place.

The resin in the unit may comprise two layers of cation-exchange resin, the top layer being weakly acidic and the bottom layer being strongly acidic or alternatively may comprise two layers of anion-exchange resin, the top layer being weakly basic and the bottom layer being strongly basic. Ion-exchange units containing such resin layers will be referred to herein and in the claims respectively as "a stratified cation unit" and "a stratified anion unit."

A unit containing a single cation-exchange resin may be used in conjunction with a unit containing a single anion-exchange resin layer or alternatively in conjunction with a stratified anion unit. Further, a stratified cation unit may be used in conjunction with a unit containing a single anion-exchange resin layer or alternatively in conjunction with a stratified anion unit.

A mixed bed unit (i.e. a unit containing an intimate mixture of both anion- and cation-exchange resins) may be used in conjunction with any of the above combinations.

FIG. 1 shows the effect of the flow rate of regenerant on regeneration efficiency.

FIG. 3 shows the regenerated unit of FIG. 2 in which raw water is being treated.

Figure 2:
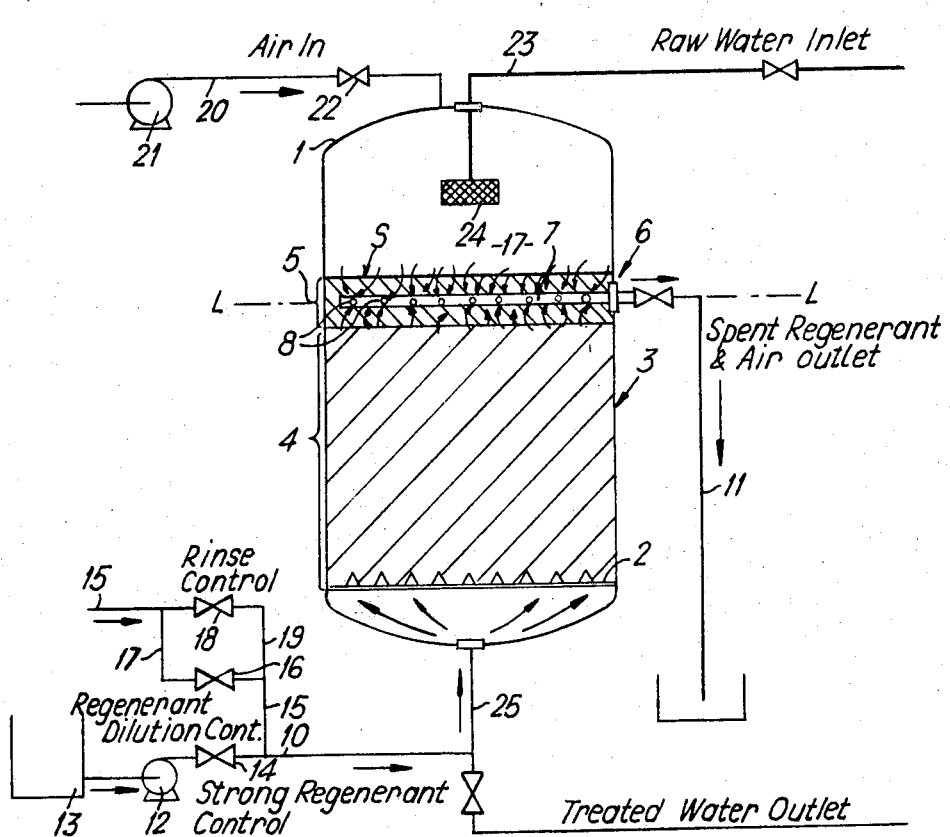
FIG. 2 is a diagram of one form of ion-exchange unit in which the resin is being regenerated by the process of this invention.

Referring to the drawings:

In FIG. 2, a water treating ion-exchange unit operable by passing the water downwards through the ion-exchange resin and set up for counter-current regeneration of the resin has a closed upright cylindrical container 1; a perforated bottom tray 2 supporting a particulate ion-exchange bed 3 composed of a layer 4 of ion-exchange resin and a topmost layer 5 of inert particulate material; and collector system 6 buried in the layer 5 and consisting of a main pipe 7 discharging through the container wall and series of branch pipes 8 extending from opposite sides of the main pipe and having entry orifices (not shown) in the lower wall portions thereof. The entry orifices are spaced upwardly from the bottom of the layer 5 so that any maldistribution of liquid occurs in the layer 5 and not in the layer 4. When the regenerated unit is set up for the treatment of raw water (FIG. 3), the raw water enters the top of the container through a valve-controlled line 23 and a distributor 24, and treated water passes from the bottom of the container through a valve-controlled outlet line 25.

The regenerant liquid is introduced into the bottom of the container through an inlet line 10 and the line 25, and the spent regenerant liquid passes from the collector system through a discharge line 11.

A measuring pump 12 draws strong regenerant solution from a measuring tank 13 and delivers the solution to the inlet line 10 through a control valve 14.

A pipe 15 delivers water to the inlet line 10 selectively through a control valve 16 in a branch line 17 to dilute the strong solution or through a control valve 18 in a branch line 19 for displacement and rinsing purposes. The water pipe 15 is connected to a water main or to a pump, the pressure available being usually not less than 30 p.s.i. Regenerant liquid diluted to the desired strength is introduced into the bottom of the container through the lines 10 and 9 and passes upwards through the bed 3 and into the collector system 6 through the entry orifices thereof.

When the preselected quantity of diluted regenerant solution has passed, the pump 12 is shut down and the valve 14 is closed. The flow of dilution water through the valve 16 is allowed to continue so that there is an upward flow of dilution water which displaces regenerant solution from the interstices of the resin layer 4 and passes into the collector system.

Finally, by closing the valve 16 and opening the valve 17 an upward flow of water is created to rinse thoroughly the last traces of regenerant solution from the resin, this flow passing also into the collector system.

The unit is then filled and returned to service.

The following are examples of regeneration cycles:

|  | Liquid upflow rate, g.p.m./ft.² | Head loss at collector system, inches W.G. |
|---|---|---|
| 1. Cation-exchange resin: | | |
| (a) Dilute HCl regenerant injection | 1 | 4 |
| (b) Displacement by water | 0.76 | 2.4 |
| (c) Rinse by water | 3 | 36 |
| 2. Anion-exchange resin: | | |
| (a) Dilute NaOH regenerant injection | 1.5 | 10 |
| (b) Displacement by water | 1.4 | 9 |
| (c) Rinse by water | 3 | 20 |

A feed line 20 connects a semi-positive-displacement air blower 21 with the top of the upper region 17 (freeboard space) of the container, and an on/off valve 22 is provided in the line 20.

During each stage of the regeneration cycle there is a continuous upward flow of liquid through the lines 10 and 25 and the layer 4. The liquid passes upwards through the lower stratum of the inert layer 5, into the collector system 6 through the entry orifices thereof, and out of the collector system through the discharge line 11.

During each regeneration stage, pressurised air is introduced into the freeboard space 17 through the feed line 20 by opening the valve 22, and the body of pressurised air in the space 17 maintains the upflowing liquid depressed to a level L—L which is the level of the entry orifices through which air flows from the space 17 into the main pipe 7 of the collector system. The air and liquid together pass from the container into the line 11.

Thus, during each stage of the regeneration cycle there is a continuous flow of gas through the freeboard space 17, and the body of pressurised gas in the freeboard space suppresses substantially the entire head of liquid which normally forms above the orifices during upflow and which in rising above the surface S of the bed tends to cause fluidisation of the bed. With the liquid during upflow maintained at the depressed level below the bed surface S, there is no fluidisation of the bed.

Air blowers as at 21 are readily available commercially with a maximum discharge pressure of 5 p.s.i.g. In operation, these blowers supply air at a pressure determined by the system resistance. The head loss across the collector system measured in inches water gauge ranges from 2" to 3" water gauge up to 30" to 40" water gauge. Thus, air is readily available commercially at pressures substantially higher than any head loss, but much lower than the pressure at which water is readily available from a main supply. Consequently, the upward flow of liquid through the ion-exchange resin cannot readily be influenced by the air pressure, yet the air pressure is in considerable excess over the hydraulic entry loss of the liquid being collected by the collector system.

It is found that in use under service conditions of a unit regenerated by the simple and positive method of the present invention, a high quality of treated water is obtained. Leakage figures are obtained which are a very substantial improvement over those obtained following regeneration by previously proposed methods. Thus, a percent leakage at the terminating point of the service cycle following regeneration by the method of the present invention was 0.32%, while the leakage figure obtained following previously proposed methods of regeneration was of the order of 1%. This high quality of treated water was not achieved by use of a very high regenerant level, as the regeneration efficiency was of the order of 85%.

There is an appreciable volume change of weakly acidic and weakly basic resins when they pass from the regenerated state to the exhausted state. In the case of the weakly acidic cation-exchange resin IRC.84, the resin expands in volume 65% when converted from the hydrogen form to the sodium form, and 15% when converted from the hydrogen form to the calcium or magnesium form. In the case of the weakly basic anion-exchange resin IRA.93, the salt form has the largest volume and the regenerated form (the free base form) has the smallest volume. In this case the resin expands 23% when converted from the free base form to the chloride form.

These volume changes bring about engineering difficulties in the correct positioning of the collector system. For example, with IRA.93 the resin contracts during the treatment cycle when the anion resin passes from the free base form to the salt form. At the end of a treatment cycle the level of the resin could therefore be below the level of the collector system. Ion-exchange resins are expensive and their ineffective use adds unnecessarily to the cost of the equipment. It is therefore very advantageous to have as an additional feature a particulate ion-exchange bed composed of a layer 5 of inert resin beads on top of the layer of ion-exchange resin during regeneration; the depth of this layer 5 of inert beads should be such that during the changes in level of the ion-exchange resin, inert resin always surrounds the collector system. Moreover, the inert top layer 5 serves as a buffering layer between the pressurised gas and the layer of ion-exchange resin which is thus unaffected by the gas. Also, the inert layer ensures uniformity of flow of regenerant liquid upwards through the ion-exchange resin, as any maldistribution in the upward flow pattern occurs in the inert layer at the approaches to the collector system.

Referring now to FIG. 3, it has now been found particularly advantageous to use an inert resin 5 which has a density less than 1. During the normal service when the water to be treated is flowing downwards through the unit, this inert-resin layer 5 having floated to the top of the unit, stays there as indicated.

If the water to be treated contains some suspended matter, this could collect on the ion-exchange resin and consequently has to be removed by occasional backwashing. During the backwash period the inert-resin layer 5 having floated to the top of the unit, stays there.

During regeneration (FIG. 2) when the unit is drained down, the inert resin layer 5 sinks and rests on top of the ion-exchange resin layer 4, and there ensures a uniform flow of the regenerant liquid up through the ion-exchange resin layer 4 into the collector system 6.

The following example is intended to illustrate the invention in greater detail:

EXAMPLE

A specific water treatment was effected as follows:

Water having dissolved impurities consisting of

|  | P.p.m. as CaCO₃ |
|---|---|
| Alkalinity | 112 |
| Equivalent mineral capacity | 85 |
| Silica | 12.5 |
| Total | 209.5 | was passed downwards through a stratified-bed cation exchange unit containing, respectively, 0.125 cubic feet of a weakly acidic resin, namely Amberlite (trademark) IRC 84, and 0.125 cubic feet of a strongly acidic resin, namely Amberlite IR 120. The unit operated to convert all mineral ions to hydrogen ions, and produced 300 gal. of decationised water before exhaustion of the resins.

Prior to the exhaution cycle, the cation unit was regenerated at a level of 3 lb. of 100% sulphuric acid per cubic ft. of total resin by a regeneration cycle which included flowing the diluted acid upwards through the unit and pressurised air downwards through the unit. Approximately 70% of the acid was introduced as a 0.75% solution, and the remainder was introduced as a 3% solution. As the resins were regenerated without first backwashing, the unity of the layers was undisturbed and consequently the regenerating efficiency was not adversely affected.

No precipitation of calcium sulphate occurred in the unit.

The combined capacity of the two cation resins calculated from the volume of water treated and the impurities present in the water amounted to 2.51 lbs. as $CaCO_3$ per cubic foot of resin.

The regeneration efficiency calculated from the capacity and the amount of regenerant used amounted to 82%.

The water thus decationised and having dissolved impurities consisting of

|   | P.p.m. as $CaCO_3$ |
|---|---|
| Carbonate and bicarbonate | 192.5 |
| Sulphates | ⎫ |
| Chlorides | ⎬ 85.0 |
| Nitrates | ⎭ |
| Silica | 12.5 |
|   | 290.0 | was then passed downwards through a stratified-bed anion unit containing layers of anion exchange resins consisting of 0.125 cubic feet of the weakly basic resin Amberlite IRA 93, and 0.125 cubic feet of the strongly basic anion exchange resin Amberlite IRA 402. The unit operated to remove all ions from the decationised influent, and produced 190 gal. of deionised water before exhaustion of the resins.

Prior to the exhaustion cycle, the anion unit was regenerated at a level of 2.12 lb. of 100% sodium hydroxide per cubic foot of resin by a regeneration cycle including flowing sodium hydroxide as a 4% solution upwards through the unit and pressurised air downwards through the unit.

The combined capacity of the two anion resins calculated from the volume of water treated and its acidic constituents amounted to 2.2 lb. as $CaCO_3$ per cubic foot of resin.

The regeneration efficiency calculated from the capacity and the amount of regenerant used amounted to 83%.

With the cation unit and the anion unit operated in series, the conductivity of the treated water was less than 1.0 microohm/cc.

The regeneration efficiencies and also the quality of the treated water represent substantial improvements over conventional ion-exchange techniques.

I claim:

1. A process for regenerating exhausted ion-exchange material in an ion-exchange apparatus which includes a particulate ion-exchange bed in the lower region of a container and a collector in the container at the upper end of the particulate bed and having entry means for upflowing treating liquid, the process comprising continuously passing treating liquid upwards through the bed and out of the container through the collector and providing pressurised gas in the upper region of the container to depress the static head of liquid above the entry means of the collector to a level at which fluidisation of the particulate bed is inhibited, wherein gas at a pressure in excess of that required to maintain the liquid at the depressed level is continuously fed into said upper region and gas is continuously released from said upper region at the depressed level of the liquid so as to relieve said upper region continuously of said excess gas pressure.

2. The process according to claim 1, wherein said depressed level of liquid lies below the surface of the particulate bed.

3. The process according to claim 1, wherein the gas is air.

4. A process according to claim 1, wherein the collector is disposed at said depressed level of the liquid so that gas and liquid pass simultaneously through the collector.

5. A process according to claim 4, wherein the collector is buried in a layer of inert material constituting the top of the bed.

6. A process according to claim 5, wherein the layer of inert material has a density less than that of the ion-exchange resin so that the inert material floats to the upper end of the container when liquid fills the container.

7. A process for regenerating exhausted ion-exchange material in an ion-exchange apparatus which includes a particulate ion-exchange bed in the lower region of a container and a collector in the container at the upper end of the particulate bed and having entry means for upflowing treating liquid, the process comprising continuously passing treating liquid upwards through the bed and out of the container through the collector and providing pressurised gas in the upper region of the container to depress the static head of liquid above the entry means of the collector to a level at which fluidisation of the particulate bed is inhibited, wherein the regeneration is effected in a plurality of stages there being different liquid upflow rates at different stages and at each stage gas from a source at a pressure in excess of that required to maintain the liquid at the depressed level during the stage with the highest liquid upflow rate is continuously fed into said upper region and gas is continuously released from said upper region at the depressed level of the liquid so as to relieve said upper region continuously of said excess gas pressure whereby the need for adjustment of the gas flow from the source at each stage of the regeneration cycle is avoided.

References Cited

UNITED STATES PATENTS 2,855,364  10/1958  Roberts _____ 210—35

SAMIH N. ZAHARNA, Primary Examiner

U.S. Cl. X.R.

210—279